United States Patent [19]
Graf

[11] 3,718,853
[45] Feb. 27, 1973

[54] PULSE WIDTH LIMITING MEANS FOR INVERTER CIRCUITS

[75] Inventor: Carlton Eugene Graf, Erie, Pa.
[73] Assignee: General Electric Company
[22] Filed: Aug. 16, 1971
[21] Appl. No.: 171,970

[52] U.S. Cl. ................................321/12, 321/45 C
[51] Int. Cl. .........................H02m 1/18, H02m 7/52
[58] Field of Search..........321/5, 9 A, 11, 12, 13, 45, 321/45 C; 318/227

[56] References Cited

UNITED STATES PATENTS

| | | | |
|---|---|---|---|
| 3,559,028 | 1/1971 | Stodtmann et al. | 321/9 A |
| 3,120,634 | 2/1964 | Genuit | 321/45 C |
| 3,448,367 | 6/1969 | Corey | 321/12 |

FOREIGN PATENTS OR APPLICATIONS 1,190,847   5/1970   Great Britain..................321/9 A Primary Examiner—William H. Beha, Jr.
Attorney—James C. Davis, Jr. et al.

[57] ABSTRACT

An inverter circuit utilizing gate controlled load rectifiers for changing direct current electric power to alternating current electric power and gate controlled commutating rectifiers for commutating the respective load rectifiers is provided with control apparatus for sensing commutating current during the commutation of a first load rectifier and blocking commutation of a second load rectifier (through the firing or turning "on" of the respective commutating rectifier) during a blocking time interval including a variable commutation interval during which commutating current is sensed and a fixed delay interval following the commutation interval.

14 Claims, 6 Drawing Figures

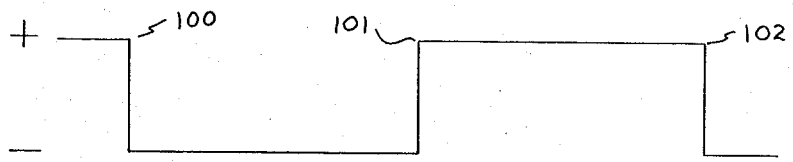
FIG. 2ᵃ
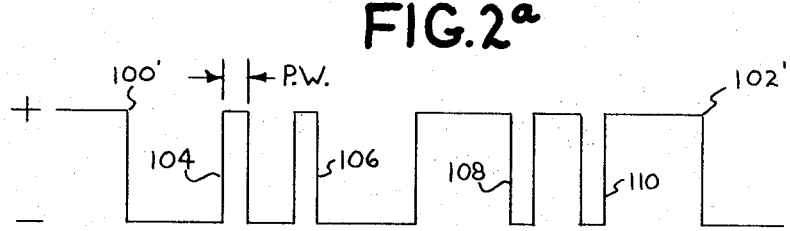
FIG. 2ᵇ
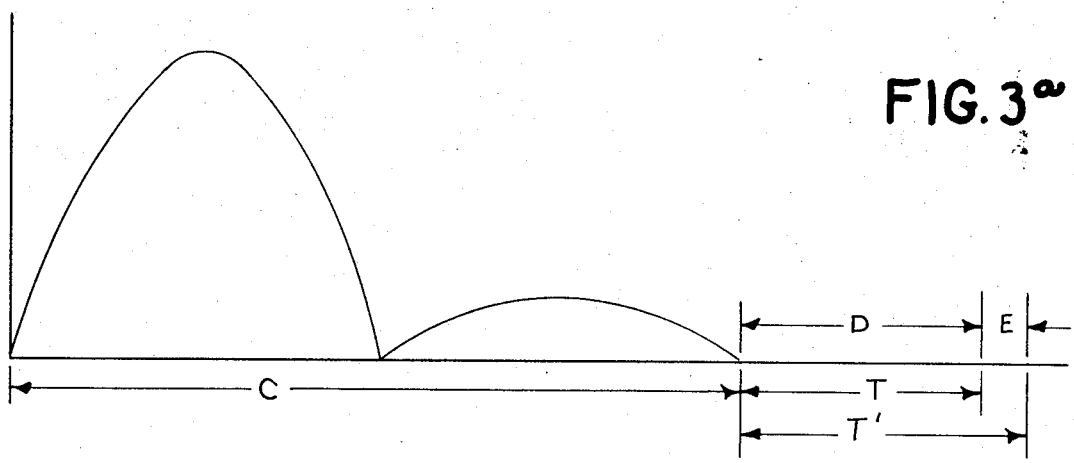
FIG. 3ᵃ
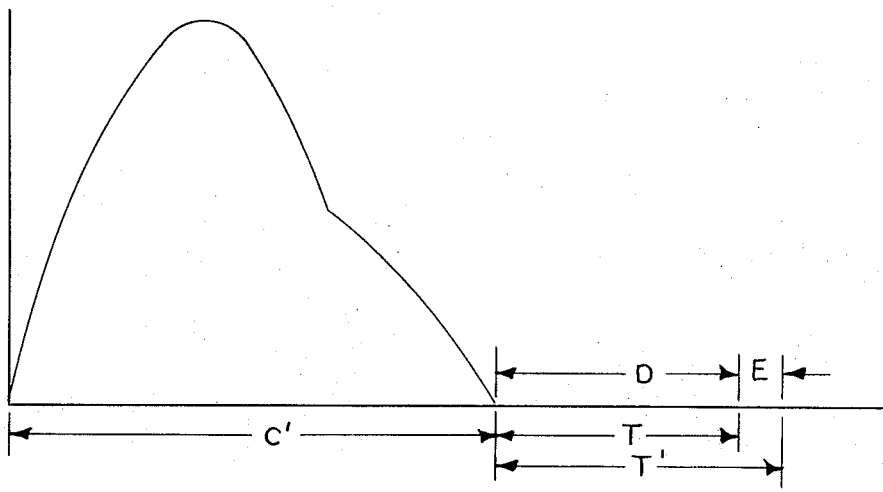
FIG. 3ᵇ

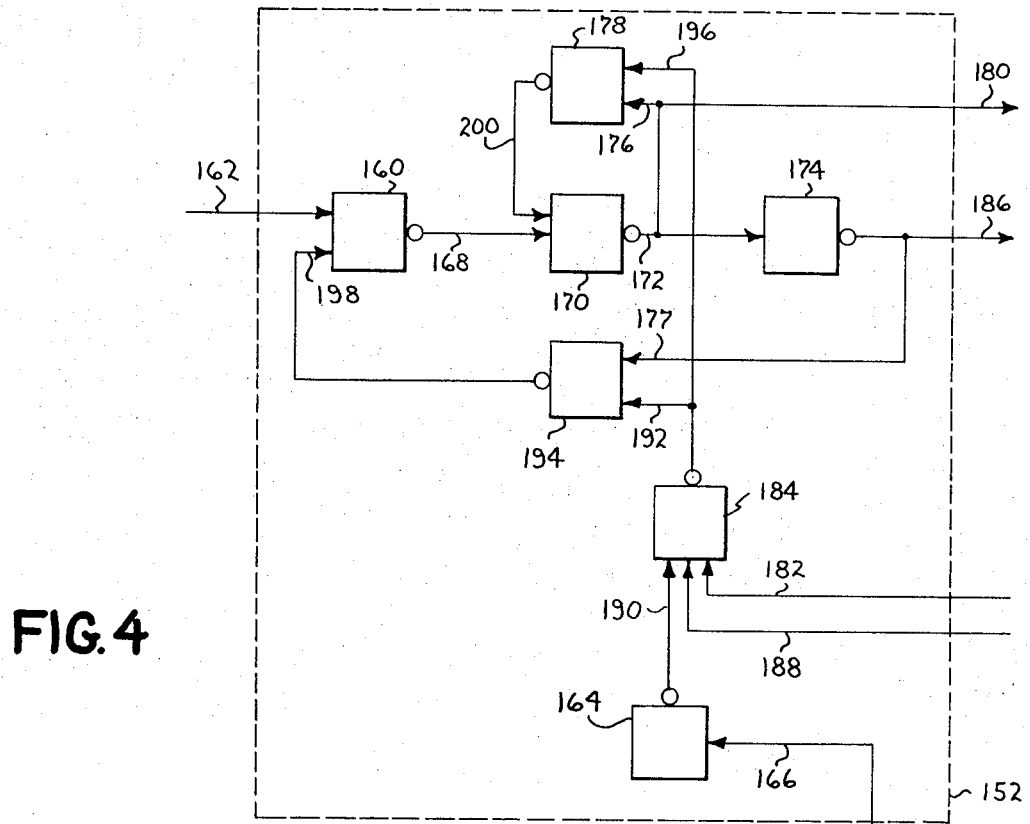
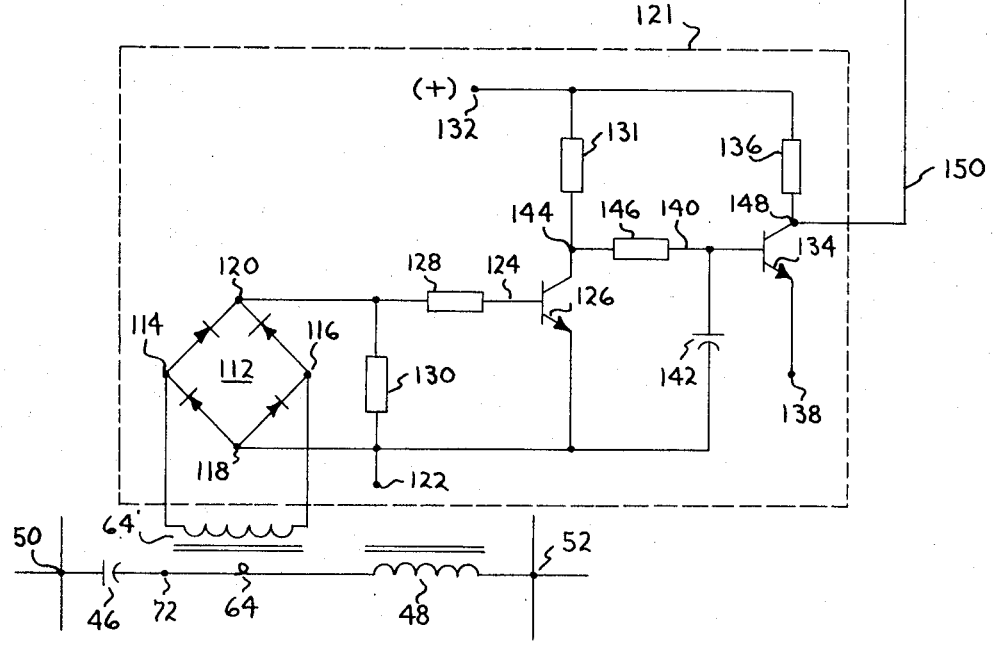
FIG.4

PULSE WIDTH LIMITING MEANS FOR INVERTER CIRCUITS

BACKGROUND OF THE INVENTION

1. Field of the Invention

This invention relates to pulse width limiting means for inverter circuits in which direct current electric power is changed to alternating current electric power and, more particularly, to means for establishing a minimum time interval between sequential firing of series connected commutating gate controlled rectifiers, the minimum time interval being consistent with the turn-off characteristics of the commutating rectifiers.

2. Description of the Prior Art

This invention is applicable to inverter circuits of the general type disclosed and claimed by U.S. Pat. No. 3,207,974, to McMurray, dated Sept. 21, 1965, and assigned to the assignee of this invention. This invention is particularly applicable to inverter circuits in which the output polarity is rapidly switched in order to provide voltage control. Such inverter circuits are described by copending Pat. application Ser. No. 81,758, titled "Adjustable Speed Polyphase A-C Motor Drive," filed on Oct. 19, 1970, in the names of Carlton E. Graf and Werner K. Volkmann, and copending patent application Ser. No. 81,757, titled "Synchronous Time Ratio Control Power Regulator," filed on Oct. 19, 1970, now abandoned, in the name of Carlton E. Graf, both applications being assigned to the assignee of this invention. While the present invention will be described herein in connection with typical inverter circuits of the type taught by the aforesaid references, a more complete basic understanding of such circuits and time-ratio-controlled switching may be obtained from the McMurray patent and the aforesaid patent applications.

In inverter circuits of the type taught by McMurray, direct current electric power is changed, or "inverted," to alternating current by means of load current carrying gate controlled rectifiers such as silicon controlled rectifiers (SCRs) which are commutated "off" by commutating circuitry including gate controlled commutating rectifiers. By way of example, direct current power is inverted to single phase alternating current power by means of a pair of controlled load rectifiers and a commutating circuit including a respective pair of controlled commutating rectifiers, a commutating capacitor, and a commutating inductor. In a multi-phase inverter system, similar circuitry is provided for each phase. To commutate a first load rectifier "off," the respective first commutating rectifier is turned "on" to connect a series oscillatory circuit including the associated capacitor and the associated inductor across the load rectifier. A current pulse produced by the discharging series oscillatory circuit takes over the function of supplying the load current, excess commutation current being conducted around the first load rectifier by a feedback diode. While the commutation current exceeds the load current, the first load rectifier is reversely biased and is turned "off" if the reverse bias lasts for a period greater than the turn-off time of the rectifier. After the commutating capacitor has been charged to an opposite polarity, the first commutating rectifier is reversely biased and therefore ceases to conduct. If this condition is maintained for the turn-off time of the first commutating rectifier, it will not conduct when the second commutating rectifier is turned "on" to commutate the second load rectifier. If, however, the second commutating rectifier is turned "on" too soon, the forward bias thereby established across the first commutating rectifier will cause it to start conducting again along with the second commutating rectifier. The result of such simultaneous conduction by both commutating rectifiers is effectively a short circuit, known as a "commutating shoot-through," across the DC source. A shoot-through can result in current levels far greater than those existing during normal operation of the inverter circuit. It is therefore highly desirable that commutating shoot-throughs be avoided.

In the inverter circuits taught by the aforesaid patent applications, voltage control is provided by rapid time-ratio-controlled switching or "chopping" superimposed upon the fundamental output frequency of the inverter. This time-ratio-controlled switching produces a series of electric pulses having a duration, or "width," determined primarily by the rate at which successive commutations occur. Since, as discussed above, a commutating rectifier should not be turned on until the commutating rectifier in series with it has had sufficient time to turn off fully, it will be seen that the characteristics of the circuit components, especially the turn-off time of the commutating rectifiers, limit the maximum rate at which successive commutations can occur. Stated differently, the characteristics of the circuit components limit the minimum width of the electric pulses produced by each phase of the inverter.

It has heretofore been proposed that timing means be provided for sensing the firing or turning on of one of the commutating rectifiers and thereafter preventing the firing of the other commutating rectifier for a fixed time interval sufficient for the first rectifier to turn off fully. To be effective throughout the entire range of inverter operation, it is essential that the timing means provide a fixed delay interval sufficient to assure full turn off under any operating conditions which might be encountered. Stated differently, the timing means must operate such that the full-turn-off is accomplished following the longest conceivable commutation interval. Since commutation under no load or light load conditions typically takes substantially longer than commutation under maximum load conditions, it has been desirable heretofore to provide a timing interval related to the longest predictable commutation time. In addition, since the actual time interval measured by the timing means may vary substantially from the intended interval, the possibility of such a deviation must be taken into account when designing the equipment. As a result of these factors, the fixed delay interval during which commutation of the other commutating rectifiers is prevented is typically much longer than necessary under most operating conditions. By way of example, let it be assumed that commutation of the load rectifier requires 120 microseconds under no load and 80 microseconds under maximum load, that the maximum turn-off time of the commutating rectifier is 40 microseconds, and that the tolerance on the timing is ±20 percent. Under such circumstances, it would be necessary to provide an intended timing delay of 192 microseconds, the delay interval including 120 microseconds for load rectifier commutation, 40 microseconds for commutating rectifier turn-off, and 32 microseconds for timing error (the actual delay interval might be short). The actual delay interval would thus range between 160 and 224 microseconds. If the inverter is now operated under maximum load conditions, the required delay interval would only be 120 microseconds (80 + 40). Under these conditions, the actual delay interval will range between 40 and 104 microseconds longer than required. It will be appreciated that the minimum width of output pulses thus established is unnecessarily long under most operating conditions, thereby unduly limiting the voltage control capabilities of the inverter system.

SUMMARY OF THE INVENTION

It is an object of this invention to provide in inverter circuits means for establishing a minimum time interval between sequential firing of series connected commutating controlled rectifiers consistent with component characteristics and system requirements.

Another object is to provide means for permitting the output pulses from an inverter to have a minimum pulse width, or duration, consistent with component characteristics and system requirements.

Yet another object of the invention is to provide means for controlling the minimum width, or duration, of the inverter output pulses such that the minimum width is not fixed, but varies with inverter operating conditions.

A further object is to provide for inverters improved means for preventing the simultaneous conduction of series connected commutating rectifiers.

A still further object of this invention is to provide improved means for preventing commutating shoot-throughs in inverters.

Briefly stated, in carrying out the invention in one form, an inverter circuit is provided with control apparatus including means for sensing the commutation current during commutation of one of a pair of load rectifiers and means responsive thereto for blocking commutation of the other load rectifier during a blocking time interval comprising the interval during which commutation current is sensed and a fixed delay interval. By a further aspect of the invention, the blocking means includes logic means having first input means for receiving firing signals for the respective commutating rectifiers, output means for supplying the firing signals to the commutating rectifiers, and second input means for receiving blocking signals. The logic means is responsive to a blocking signal to block the transmission of firing signals between the first input means and the output means. The blocking means also includes means responsive to the current sensing means for generating a blocking signal throughout substantially the entire blocking time interval. By a still further aspect of the invention, the means for generating the blocking signal includes switching means having two conductive states, means for maintaining the switching means in one selected state throughout the interval during which commutating current is sensed, and delay timing means preferably comprising a capacitor. Due to the switching means remaining in the selected states throughout commutation and a delay following commutation produced by the timing means, a blocking signal is produced during the entire blocking time interval. The delay produced by the timing means is selected to provide a sufficient turn-off time for the commutating rectifier following the commutation of the respective load rectifier.

BRIEF DESCRIPTION OF THE DRAWINGS

While the novel features of this invention are set forth with particularity in the appended claims, the invention, both as to organization and content, will be better understood and appreciated, along with other objects and features thereof, from the following detailed description taken in conjunction with the drawings, in which:

FIGS. 2a and 2b illustrate phase voltage waveforms typically produced by inverter power circuits of the type illustrated by FIG. 1;

FIGS. 3a and 3b illustrate the variation in the blocking time interval produced under various inverter operating conditions by the control apparatus of this invention; and FIG. 4 is a schematic representation of a preferred form of the control apparatus of FIG. 1 for a single phase of the inverter power circuit.

DETAILED DESCRIPTION

Figure 1:
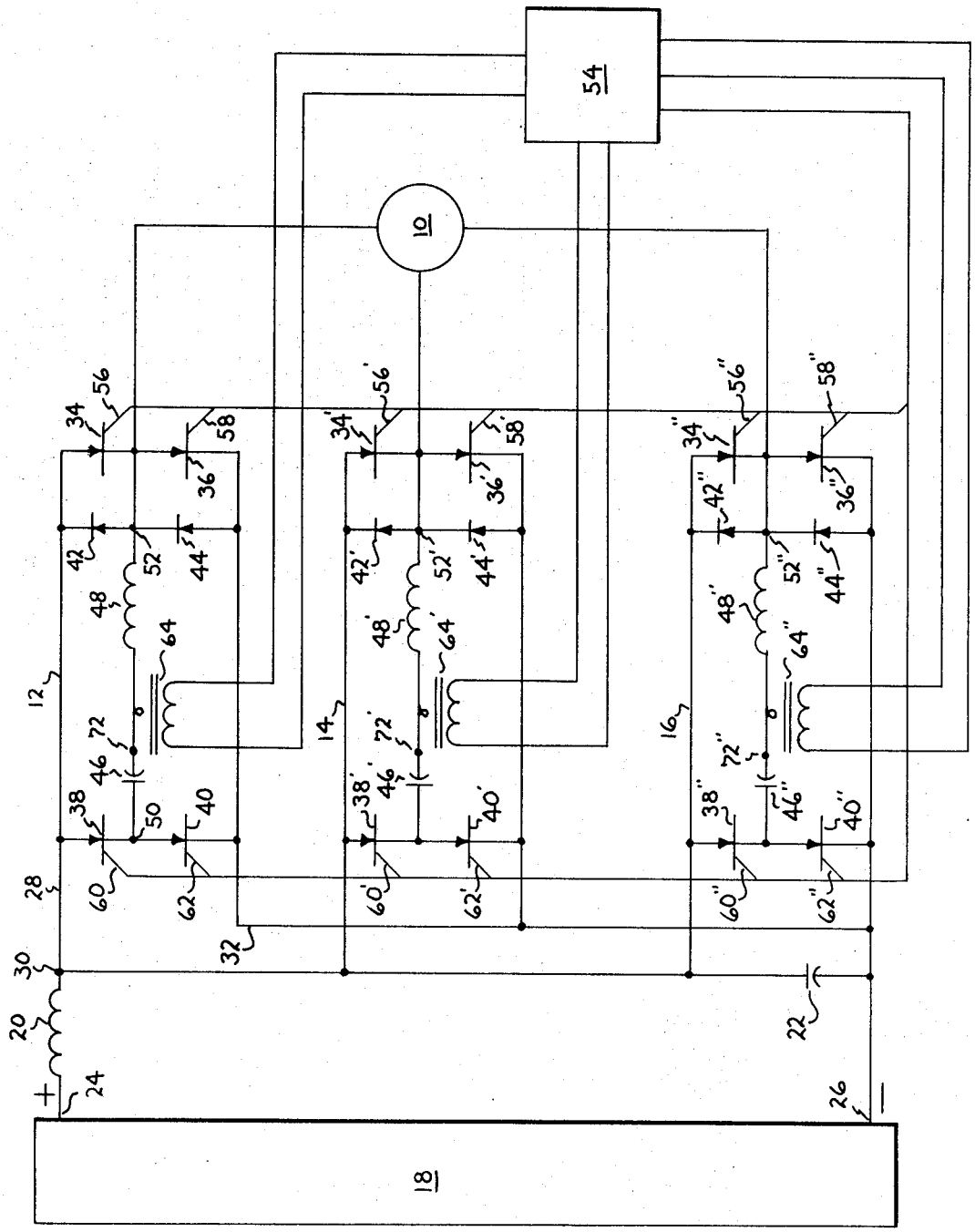
FIG. 1 is a schematic circuit diagram of a polyphase inverter power circuit and control apparatus therefor in accordance with this invention.

Referring first to FIG. 1, a three-phase adjustable speed drive system of the type disclosed by the aforesaid McMurray patent and the aforesaid patent applications is illustrated, the drive system including a three-phase induction motor 10 having phases A, B and C supplied with alternating current electric power from power conversion apparatus including single phase, full wave inverter circuits 12, 14 and 16. Each of the inverter circuits 12, 14 and 16 inverts direct current electric power from a DC source 18 to the alternating current power supplied to the motor 10. Any convenient source of DC electrical power may be used, such as a battery or a rectifying device for converting AC input power to unidirectional output power. To attenuate ripple and provide a low impedance DC source, a filter is provided, the filter comprising an inductor 20 connected to the positive terminal 24 of the DC source 18 and a capacitor 22 connected to the inductor 20 at 30 and to the negative terminal 26 of the DC source 18. It will occur to those skilled in the art that the power conversion apparatus could alternately be utilized to convert alternating input electric power to output alternating electric power of a different frequency.

The inverter circuit 12 for phase A includes a positive bus 28 connected to the electrical junction 30 between the inductor 20 and the capacitor 22 and a negative bus 32 connected to the negative terminal 26 of the DC source 18. The inverter circuit 12 includes a pair of load current gate controlled rectifiers 34 and 36 connected in series between the positive bus 28 and the negative bus 32 with the anode of rectifier 34 connected to the positive bus 28. Gate controlled rectifiers 38 and 40 are also connected in series between the buses 28 and 32 with the same polarity as the gate controlled rectifiers 34 and 36. The gate controlled rectifiers 34, 36, 38 and 40 are preferably silicon controlled rectifiers, but it will be obvious that functionally equivalent devices such as gaseous thyratrons can be used. Diode rectifiers 42 and 44 are connected in parallel across the controlled rectifiers 34 and 36, respectively, in reverse polarity, and an inductance 48 and a capacitor 46 are connected in series between the junction 50 of the gate controlled rectifiers 38 and 40 and the junction 52 of the gate controlled rectifiers 34 and 36 and the diode rectifiers 42 and 44. Phase A of the induction motor 10 is connected to the junction 52 for receiving alternating current from the inverter circuit 12.

Inverter circuits 14 and 16 for supplying alternating current to Phases B and C, respectively, are identical in physical structure and mode of connection to the DC source 10 to the inverter circuit 12. Accordingly, like elements in circuit 14 are indicated by primed numerals and like elements in circuit 16 are indicated by double primed numerals.

As illustrated by FIG. 1, control apparatus 54 is provided for turning on the gate controlled rectifiers 34, 36, 38 and 40 of the inverter circuit of Phase A by means of firing signal pulses supplied through connections 56, 58, 60 and 62, respectively. Similar signal pulses are also supplied through appropriate connections to the gate controlled rectifiers of the circuits 14 and 16. In accordance with the invention, the control apparatus 54 includes a current transformer 64 and associated apparatus for sensing the commutation current in the inverter circuit 12 of Phase A. Similar current transformers 64' and 64'' are provided for the inverter circuits 14 and 16 of Phases B and C, respectively.

Before turning attention to the control apparatus of this invention, the general mode of operation of the drive system of FIG. 1 will be described. It should be borne in mind that the function of the inverter circuits 12, 14 and 16 is to transform DC power from the source 18 to AC power for delivery through Phases A, B and C to the motor 10. To accomplish this in Phase A, the gate controlled rectifier 34 and the gate controlled rectifier 36 of circuit 12 conduct alternately for time periods established by the control apparatus 54 and firing signal pulses which it supplies to the rectifiers. The manner in which the alternating conduction is accomplished will now be described briefly with respect to Phase A and the inverter circuit 12.

Initially, let it be assumed that the main controlled rectifier 34 is conducting current to the motor 10. As a result of previous operation, the capacitor 46 is charged such that a point 72 between the capacitor 46 and the inductor 48 is positive in potential with respect to the junction 50. To commutate the controlled rectifier 34 "off," the commutating controlled rectifier 38 is turned "on" by a firing signal pulse from the control apparatus through connection 60. A series oscillator circuit comprising the commutating capacitor 46 and the commutating inductor 48 is now connected across the load current carrying controlled rectifier 34. A current pulse produced by the discharging series oscillatory circuit takes over the function of supplying load current to the motor 10 and causes the diode 42 to be forward biased. As a result, the current through the controlled rectifier 34 is reduced to zero. The feedback diode 42 conducts excess commutation current around the controlled rectifier 34 and provides a limited reverse bias across the controlled rectifier 34. This reverse bias lasts for a period greater than the turn-off time of the controlled rectifier 34 so that this controlled rectifier is caused to turn "off," i.e., to regain its blocking mode of operation.

After the commutating capacitor 46 has been charged to the opposite polarity, so that the junction 50 is more positive in potential than the positive bus 28, the commutating controlled rectifier 38 is reversely biased and therefore ceases to conduct. The commutating rectifier 38 will turn off fully if the reverse bias is maintained for its turn-off time. The commutating capacitor 46 has the appropriate polarity to commutate "off" the main controlled rectifier 36 when the commutating controlled rectifier 40 is turned "on." It is essential, however, that the rectifier 40 not be turned "on" before the reverse bias across the rectifier 38 has been held for a period sufficient to ensure full turn-off of the rectifier 38. If rectifier 40 were turned on prematurely, the forward bias established on rectifier 38 would cause it to resume conducting along with rectifier 40. The result of such simultaneous conduction would be effectively a short circuit, or a commutating shoot-through, across the DC source 18.

After the controlled rectifier 34 is commutated "off," the controlled rectifier 36 may be turned "on," and after it is commutated "off" in turn rectifier 34 may be turned "on" to start another electrical cycle. The voltage supplied to Phase A will typically have a fundamental waveform as illustrated by FIG. 2a with the interval between points 100 and 102 representing 360 electrical degrees.

It will, of course, readily occur to those skilled in the art that the conduction of the gate controlled rectifiers 34' and 36' of circuit 14 and the gate controlled rectifiers 34'' and 36'' of circuit 16 are controlled in the same manner by firing signal pulses supplied thereto from the control apparatus 54 over the appropriate connections. The alternating current thus supplied to phases B and C of the motor 10 by the inverter circuits 14 and 16, respectively, has the same fundamental frequency as the alternating current electric power supplied to Phase A, but the waveforms supplied to the three phases are displaced from one another in time by 120 electrical degrees as is customary in three-phase systems.

In addition to controlling the fundamental frequency at which the alternating current power is supplied to the induction motor 10, the control apparatus 54 preferably includes means as taught by the aforesaid copending patent applications to control the average voltage by means of time-ratio-controlled switching of the gate controlled rectifiers of the circuits 12, 14 and 16. More particularly, operation in the manner described above results at any selected point in time in two phases being connected to one potential of the DC supply and the other phase being connected to the other potential of the DC supply. For example, at a selected period in time, rectifier 34 and 34' may be conducting from positive buses 28 and 28' while rectifier 36'' is conducting to negative bus 32''. At another period in time, rectifier 34' may be conductive from positive bus 28' while rectifiers 36 and 36'' are conducting to negative buses 32 and 32.'' As taught in the aforesaid applications, the gate controlled rectifiers of the sole circuit connected to one of the potentials are switched in a time-ratio-controlled manner at a switching frequency substantially higher than that of the fundamental frequency. Time-ratio-controlled switching is illustrated for the voltage output of Phase A by FIG. 2b. Pulses 104, 106, 108 and 110 produced by time-ratio switching of inverter circuit 12 are shown superimposed upon the fundamental waveform between points 100' and 102'. In accordance with the foregoing discussion, it will be appreciated that the duration or width of the pulses, as illustrated by "P.W." for pulse 104, is determined by the rate at which successive commutations of load current rectifiers occur. If, however, too rapid commutation is attempted, simultaneous conduction of the commutation rectifiers may occur. It is therefore a primary object of this invention to minimize the pulse width without causing simultaneous conduction and resulting shoot-throughs.

Referring now to FIGS. 1, 3a and 3b, the commutating current produced under extreme operating conditions in the circuit including the commutating capacitor 46 and the commutating inductor 48 of FIG. 1 will be described briefly. Under no load conditions, the commutating current typically has a long duration C as illustrated by FIG. 3a. At the end of interval C, the commutating thyristor 38 or 40 will be reversely biased and will cease to conduct at that time. However, as discussed previously, the reverse bias must be maintained for the turn-off period of the rectifier or it will begin to conduct again. The minimum delay period required for complete turn-off is represented by D in FIG. 3a. Under maximum load conditions, commutation current flows for a much shorter period C as illustrated by FIG. 3b. Under these conditions, the same delay period D is required for complete turn-off. When operating with a maximum commutation interval as illustrated by FIG. 3a, a minimum pulse width equal to C plus D will be required to prevent commutating shoot-throughs. However, when operating with a minimum commutation interval as illustrated by FIG. 3b, a smaller minimum pulse width equal to C plus D will be required. Heretofore, as discussed previously, it has been necessary to provide a timing interval related to the longest predictable commutation time, this normally being the commutation time required under no load conditions. As a result, the minimum pulse width heretofore available has typically been much larger than necessary under most operating conditions.

In accordance with the present invention, means are provided for sensing the commutation current during the actual interval, C, C' or some intermediate interval, during which commutating current flows and thereafter initiating a timed interval T' having a duration sufficient to assure a complete turn-off time T even if a timing error E results in a shorter than intended delay period. The present invention thus permits the minimum pulse width to vary with actual operating conditions and to be substantially smaller under most operating conditions than has heretofore been possible. This is accomplished by means for blocking firing signals to the commutating rectifiers for a blocking time interval comprising the appropriate commutating interval plus the fixed delay interval T'. A preferred embodiment of the invention will now be described with reference to FIG. 4.

The control apparatus illustrated by FIG. 4 is associated with the inverter circuit 12. Similar apparatus would be associated with the circuits 14 and 16. The illustrated control apparatus is included in the control apparatus 54 (FIG. 1) and includes means for sensing the commutation current and for preventing the firing of the other commutating rectifier (controlled rectifier 40 following firing of controlled rectifier 38 and controlled rectifier 38 following firing of controlled rectifier 40) for an interval sufficient for full turn-off of the previously conducting rectifier. More particularly, the control means comprises means for sensing commutation current flow, means responsive to the sensed current for generating a blocking signal, and logic means responsive to a blocking signal to block the firing of the commutating rectifiers. The commutation current sensing means includes the current transformer 64 and a rectifying diode bridge 112 having junctions 114 and 116 connected across the transformer 64. The other junctions 118 and 120 of the bridge 112 are connected to the blocking signal generating means 121. More particularly, the junctions 118 and 120 of the bridge 112 are respectively connected to source 122 of relatively negative direct current electric power and the base 124 of an NPN transistor 126 through a resistor 128. A resistor 130 is connected between the terminal 122 and the junction 120 of the bridge 112. During commutation, commutation current flow in the series oscillatory circuit including the capacitor 46 and the inductance 48 produces a proportional flow of current in the secondary 64' of the current transformer 64. Current flow from the secondary 64' of the transformer is rectified by the bridge 112 and loaded by the resistance of resistors 128 and 130 so that a unidirectional variable voltage signal proportional to actual variations in the commutation current is supplied to the base 124 of the transistor 126 regardless of the direction of the commutation current. The various components are selected such that the variable voltage signal supplied to the base 124 of the transistor 126 is sufficient to turn on the transistor immediately following the initiation of commutation current flow through the current transformer 64. The transistor 126 will remain on for the entire commutation period (C and C' of FIG. 3a and 3b).

Still referring to FIG. 4, the means for generating a blocking signal includes the transistor 126 and a resistor 131 connected in series across a source of DC electric power having a relatively positive terminal 132 and the lower potential terminal 122. Another NPN-transistor 134 and a resistor 136 are connected in series between the terminal 132 and a terminal 138 having a potential intermediate to that of positive terminal 132 and negative terminal 122. The emitter of the transistor 126 is connected to the negative terminal 122, and the emitter of the transistor 134 is connected to the terminal 138. The base 140 of the transistor 134 is connected to the terminal 122 of the power supply through a capacitor 142 and to the junction 144 of the transistor 126 and the resistor 130 through a resistor 146. The junction 148 of the transistor 134 and the resistor 136 is connected to an output conductor 150 over which a blocking signal is supplied to a logic network 152.

The operation of the blocking signal generating means 121 will now be described. As indicated above, the transistor 126 is turned off whenever commutating current is not being sensed. Prior to the initiation of commutation of one of the load rectifiers 34 or 36 by the firing of the respective commutating rectifier 38 or 40, the transistor 126 is not conductive. As a result, the positive terminal 132 is connected through resistors 131 and 146 to the base 140 of the transistor 134 to turn on the transistor 134 and to build up a positive charge on the capacitor 142. With the transistor 134 in its conductive state, junction 148 is maintained substantially at the potential of the common terminal 138, and the signal produced on conductor 150 has a magnitude determined by the potential of terminal 148. As soon as commutation current is sensed, transistor 126 turns on so that the potential at junction 144 drops to substantially that of negative terminal 122. The positive charge on the capacitor 142 discharges through the resistor 146 to the negative terminal 122, and the abrupt reduction in potential on the base 140 of the transistor 134 causes the transistor 134 to shift rapidly to its non-conductive state. When this happens, the potential at junction 148 will rise to a higher level controlled by the magnitude of the potential at terminal 132 and the resistor 136. At the end of the commutation period when the current sensing means ceases to sense current, transistor 126 will turn off again, but the capacitor 142 will delay for a period the turning on of the transistor 134. In accordance with the invention, capacitor 142 is selected such that its recharging will delay the turning on of the transistor 134 by a fixed period equal to the desired delay time T' illustrated by FIGS. 3a and 3b. It will thus be seen that the higher voltage level signal (blocking signal) at junction 148 exists for the interval comprising the commutation period (C or C') and the fixed delay interval (T').

The logic network 152 comprises a plurality of interconnected logic elements or gates of the NAND-NOR type. A NAND-NOR gate is one in which a HIGH output signal will be produced whenever at least one input signal is LOW and in which a LOW output signal will be produced whenever all input signals are HIGH. As illustrated by FIG. 4, the logic network 152 includes a gate 160 having an input leg 162 for receiving a HIGH signal when it is desired to fire the positive commutating rectifier 38 (FIG. 1) or a LOW signal when it is desired to fire the negative commutating rectifier 40 (FIG. 1). A gate 164 has a single input leg 166 connected to the conductor 150 for receiving either a HIGH blocking signal (the higher voltage level existing when transistor 134 is turned off) or a LOW non-blocking signal (the lower voltage level existing when transistor 134 is turned on). The output leg 168 of gate 160 is connected to one input leg of a gate 170, which has an output leg 172 connected to the sole input of a gate 174, to one input leg 176 of a gate 178, and to an output conductor 180 leading to the firing means for the commutating rectifier 40 (FIG. 1). The output of gate 174 is connected to one input leg 177 of gate 194 and to an output conductor 186 leading to the firing means for the commutating rectifier 38 (FIG. 1). The gate 184 also has an input leg 182 connected to receive from the firing means a LOW signal of short duration when the rectifier 38 is turned on and an input leg 188 connected to receive from the firing means a LOW signal of short duration when the rectifier 40 is turned on. HIGH signals are supplied on input legs 182 and 188 at all other times. The output of the gate 164 is connected to an input leg 190 of the gate 184. The output leg of the gate 184 is connected to the input leg 192 of a gate 194 and to an input leg 196 of the gate 178. The output of gate 194 is connected to an input leg 198 of gate 160, and the output leg 200 of gate 178 is connected to an input leg of gate 170.

The mode of operation of the logic network 152 will now be described. Let it be assumed that it is desired to commutate load rectifier 34 (FIG. 1) by firing the commutating rectifier 38. Let it also be assumed that a non-blocking LOW signal is present at input 166 of gate 164 so that a HIGH signal is present at input 190 of gate 184 and that HIGH signals are also present at inputs 182 and 188 (rectifiers 38 and 40 are turned off). This means that a LOW signal is supplied to input leg 192 of gate 194 to produce a HIGH signal at input leg 198 of gate 160 and that a LOW signal is supplied to input 196 of gate 178 to produce a HIGH signal at input 200 of gate 170. If a HIGH signal is now supplied at input 162 of gate 160, a LOW signal will be supplied to input 168 of gate 170, and a HIGH signal will be produced at its output 172. As a result of the HIGH signal at output 172, a HIGH signal is produced at output 180 and a LOW signal is produced at output 186 from gate 174. The control means for the rectifier 38 responds to the LOW signal at 186 to fire or turn on the rectifier 38 to commutate load rectifier 34. Concurrently with the firing of the rectifier 38, the signal at input 182 to gate 184 shifts temporarily from HIGH to LOW so that the output signal to inputs 192 and 196 of gates 194 and 178, respectively, becomes HIGH. Immediately thereafter, the commutating current causes the signal at input 166 at gate 164 to become HIGH and the signal at input 190 of gate 184 to become LOW for the entire blocking time interval. This means that the output signal from gate 184 will remain HIGH for the entire blocking time interval. Under these circumstances, the HIGH signals at inputs 176 and 196 of gate 178 produce a LOW signal at its output 200, whereas the HIGH signal at input 192 of gate 194 has no effect on its output 198 since the other input 177 is LOW. As a result, the output signal from gate 160 remains LOW and the HIGH output signal at output 172 of gate 170 remains unchanged.

Let it now be assumed that the signal at the input 162 to gate 160 shifts for some reason from HIGH to LOW while a HIGH blocking signal is still being supplied to the input 166 of gate 164. As indicated earlier, a LOW signal at input 162 is an indication that the firing of the commutating rectifier 40 is desired. More particularly, the logic network 152 is designed to produce a LOW signal at output 180 in response to a LOW signal at input 162, and the firing means for the rectifier 40 responds to a LOW signal at output 180 by firing the rectifier 40. This can not occur, however, so long as the HIGH blocking signal is present at the input 166 of gate 164. The reason is that a LOW signal is already present at input 200 of gate 170. A HIGH signal at input 168 caused by the LOW signal at input 162 will have no effect on the HIGH signal at output 172 and, consequently the HIGH signal at output 180. Let it now be assumed, however, that the entire blocking interval has passed and that the signal at input 166 of gate 164 has become LOW prior to the delivery of a LOW signal to input 162 of gate 160. Since at the end of the blocking interval all inputs to gate 184 will be HIGH, LOW signals will be present at inputs 192 and 196 of gates 194 and 178, respectively. A high signal remains at input 198 of gate 160, since input 177 of gate 194 has stayed at the LOW level. The signal at the output 200 of gate 178 will simultaneously become HIGH, but there will be no change in the HIGH signal at the output 172 of gate 170. If a LOW signal calling for the firing of the rectifier 40 is now supplied to input 162 of gate 160, the signal from output 168 will become HIGH, and the signal at output 172 of gate 170 will become LOW. This LOW signal is present at output 180 and will thus cause the firing of the rectifier 40.

The firing of the rectifier 40 will cause a LOW signal to be temporarily supplied immediately to the input 188 of gate 184 and a HIGH signal to be supplied to input 166 of gate 164. For the reasons discussed above, these blocking signals will prevent or block the firing of the rectifier 40 for the entire blocking period. As explained above, the blocking of firing signals for the entire blocking period assures that the rectifiers 38 and 40 will not be simultaneously conductive and that, therefore, a commutating shoot-through cannot occur. In accordance with the present invention, the blocking time interval varies with operating conditions so as to provide a minimum pulse width consistent with operating conditions.

It will, of course, be obvious to those skilled in the art that the values of the various elements comprising the circuitry illustrated by FIG. 4 must be selected properly in order to provide operation as just described. In one embodiment of the invention, a power supply providing +5 volts at terminal 132, 0 volts at common terminal 138, and −5 volts at terminal 122 was provided. The transistor 126 was JEDEC No. 2N4424 and the transistor 134 was a JEDEC No. 2N4424. In this particular embodiment, the resistors 128, 130, 131, 136 and 146 had resistances of 4.7K, 56, 4.7K, 10.K, and 1.2K ohms, respectively, and the capacitor 142 had a value of 0.01 MF. In the event that another power supply is used or if it is desired to produce the firing signal pulse at some other predetermined current level, appropriate changes in the elements would have to be made.

Although this invention has been described in connection with a preferred embodiment, it will occur to those skilled in the art that many modifications and variations are possible without departing from the spirit and scope of the invention. For example, although the invention has been described in connection with a polyphase inverter drive system in which it has particular pertinence with respect to time-ratio-controlled switching applications, it is applicable to use in preventing the simultaneous conduction of commutating rectifiers in single phase inverters. Furthermore, alternative circuits for generating the blocking signal will occur to those skilled in the art. For example, the illustrated transistors could be replaced by other switching devices turned on and off at the appropriate times by suitable control means. Accordingly, it is intended that these and other modifications of the invention be included within the scope of the appended claims.

What is claimed as new and is desired to secure by Letters Patent of the United States is:

1. In an inverter circuit including at least one set of two series connected load current carrying gate controlled rectifiers connected across a source of direct current electric power, a respective set of two series connected commutating gate controlled rectifiers of similar polarity connected across said source of electric power, and commutating circuit means interconnecting the junction of said two load current carrying gate controlled rectifiers and the junction of said two commutating gate controlled rectifiers, pulse width control means comprising:
   means for sensing commutating current in said commutating circuit means during commutation of either one of said load current carrying gate controlled rectifiers;
   and blocking means coupled to said current sensing means and responsive to the sensed commutating current for blocking commutation of the other one of said load current carrying gate controlled rectifiers during a blocking time interval comprising the interval during which commutating current is sensed and a fixed delay interval, said blocking means comprising:
   logic means having first input means for receiving a first input signal when it is desired to turn on a first one of said commutating gate controlled rectifiers and a second input signal when it is desired to turn on a second one of said commutating gate controlled rectifiers, second input means, and output means coupled to said commutating gate controlled rectifiers for supplying a first output signal for causing said first rectifier to turn on and a second output signal for causing said second rectifier to turn on,
   and means coupled to said second input means and said current sensing means for generating and supplying to said logic means a blocking signal throughout the blocking time interval, said means for generating a blocking signal including timing means responsive to the sensed commutating current for initiating the fixed delay interval at the end of the interval during which commutating current is sensed,
   said logic means being responsive, in the absence of a blocking signal, to a first input signal to produce a first output signal and to a second input signal to produce a second output signal, and said logic means being responsive to a blocking signal to block the production of output signals in response to input signals.

2. Pulse width control means as defined by claim 1 in which said means for generating a blocking signal includes timing means for establishing the fixed delay interval, said timing means being responsive to the sensed commutating current such that the fixed delay interval is initiated at the end of the interval during which commutating current is sensed.

3. Pulse width control means as defined by claim 2 in which said means for generating a blocking signal comprises circuit means and in which said timing means is an energy storage element in said circuit means.

4. Pulse width control means as defined by claim 1 in which said means for generating a blocking signal comprises:
   a resistive circuit connected across a source of direct current electric power, said resistive circuit including switching means having current blocking and current conducting states, and means connected to said switching means for shifting and switching means between said two states, said shifting means normally maintaining said switching means in a first one of said states and being responsive to the sensed commutating current to shift said switching means to a second one of said states throughout the blocking time interval, said blocking signal being a voltage signal produced at a preselected point in said resistive circuit at which a change in the states of said switching means results in a substantial voltage change.

5. Pulse width control means as defined by claim 4 in which said switching means is a transistor, said shifting means controlling the state of said transistor by the selective application of electric signals to it base.

6. Pulse width control means as defined by claim 2 in which said timing means comprises an energy storage devices and in which said means for generating a blocking signal further comprises:

first circuit means connected across a source of direct current electric power, said first circuit means including switching means having current blocking and current conducting states, and second circuit means coupled to said current sensing means, said energy storage device, and said switching means of said first circuit means for shifting said switching means between said two states by the application of electric signals thereto, said second circuit means normally maintaining said switching means of said first circuit means in a first one of said states and being responsive to the sense commutating current to shift said switching means to a second one of said states at the initiation of commutation, said energy storage device being effective to maintain said switching means in said second state for the fixed delay interval following the completion of commutation, said blocking signal being a voltage signal produced at a preselected point in said first circuit means at which a change in the state of said switching means results in a substantial voltage change.

7. Commutation control means as defined by claim 6 in which the switching means of said first circuit means is a transistor having a base connected to said second circuit means for receiving electric signals therefrom.

8. Commutation control means as defined by claim 7 in which said current sensing means is a current transformer.

9. Commutation control means as defined by claim 1 in which said logic means further comprises feedback means coupling said output means and said second input means for supplying a blocking signal to said second input means substantially simultaneously with the production of an output signal at said output means.

10. Commutation control means as defined by claim 1 in which said logic means comprises a plurality of interconnected NAND-NOR gates.

11. Commutation control means as defined by claim 8 in which said logic means further comprises feedback means coupling said output means and said second input means for supplying a blocking signal to said second input means substantially simultaneously with the production of an output signal at said output means.

12. Commutation control means as defined by claim 11 in which said logic means comprises a plurality of interconnected NAND-NOR gates.

13. Commutation control means as defined by claim 3 in which said energy storage element is a capacitor.

14. Commutation control means as defined by claim 13 in which said current sensing means is a current transformer.

* * * * *